United States Patent [19]

Woditsch et al.

[11] 4,173,485

[45] Nov. 6, 1979

[54] PRODUCTION OF ZINC AND ALKALINE EARTH METAL TITANATES

[75] Inventors: Peter Woditsch; Gerhard Winter; Günter Linde, all of Krefeld; Friedhelm Müller, Odenthal, all of Fed. Rep. of Germany

[73] Assignee: Bayer Aktiengesellschaft, Leverkusen, Fed. Rep. of Germany

[21] Appl. No.: 873,995

[22] Filed: Jan. 31, 1978

[30] Foreign Application Priority Data

Feb. 19, 1977 [DE] Fed. Rep. of Germany ....... 2707229

[51] Int. Cl.$^2$ ...................... C04B 35/46; C04B 31/02; C01G 23/00; C09C 1/04
[52] U.S. Cl. ................................. 106/73.3; 106/73.31; 106/73.32; 106/73.33; 106/292; 106/299; 106/309; 423/598
[58] Field of Search ............... 423/598; 106/73.3, 299, 106/292, 73.31, 73.32, 73.33, 309

[56] References Cited

U.S. PATENT DOCUMENTS

| | | | |
|---|---|---|---|
| 3,413,083 | 11/1968 | Daendliker et al. ................. | 423/598 |
| 3,567,480 | 3/1971 | Craig ..................................... | 106/299 |
| 3,607,338 | 9/1971 | Gates et al. ........................... | 106/299 |
| 3,725,539 | 4/1973 | Spangenberg ........................ | 423/598 |
| 3,794,507 | 2/1974 | Winter et al. ......................... | 106/299 |

FOREIGN PATENT DOCUMENTS 530584 12/1940 United Kingdom ..................... 423/598

Primary Examiner—Delbert E. Gantz
Assistant Examiner—Mark Bell
Attorney, Agent, or Firm—Sprung, Felfe, Horn, Lynch & Kramer

[57] ABSTRACT

Titanates of zinc and/or alkaline earth metals are produced by simultaneously adding to a suspension of finely divided $TiO_2$, maintained at a substantially constant pH above about 8, a solution of a salt of zinc and/or alkaline earth metal and alkali to form a hydroxide precipitate. Filtration produces a filter cake mixture of $TiO_2$ and hydroxide and calcination at above 500° C. produces the desired titanate of narrow particle size distribution and desirable optical properties. Non-simultaneous addition results in a non-filterable material. Zinc, magnesium and/or calcium are preferred and doping elements such as aluminum, phosphorus, boron and/or silicon may also be present.

11 Claims, No Drawings

PRODUCTION OF ZINC AND ALKALINE EARTH METAL TITANATES

This invention relates to a process for the production of zinc titanates and alkaline-earth metal titanates, more especially magnesium and calcium titanates, which are particularly suitable for use as white pigments for special applications, e.g. lacquers, plastics and paper, and as ferro-electrics. In the production of pigments, it is necessary to ensure that the starting materials are highly pure and to develop a production process which enables substantially uniform particle sizes with a narrow particle size distribution to be produced. The desired average particle size is dependent upon the refractive index of the pigments and increases with decreasing refractive index. However, the average particle sizes of materials having particular optical activity is distinctly below 1 $\mu$m and, in the case of titanium dioxide, the most frequently used white pigment, normally amounts to 0.23 $\mu$m. In order to produce finely divided and substantially uniform particles such as these, it is necessary to use reactive starting compounds.

It is known that magnesium and calcium titanates can be produced in accordance with British Pat. No. 417,699 and German Auslegeschrift No. 1,014,972. Using titanium dioxide and the corresponding oxides or decomposible salts of magnesium or calcium as the starting materials, the alkaline earth metal titanate is obtained by calcination at high temperatures. According to U.S. Pat. No. 2,434,079, equivalent quantities of $TiO_2$-hydrate and magnesium carbonate are mixed and calcined at 1000° C. In German Auslegeschrift No. 1,014,972, it is pointed out that it is not possible by solid-phase reactions of this type to produce individual crystals with the necessary particle size. Accordingly, German Auslegeschrift No. 1,014,972 relates to the precipitation of calcium titanium oxalate from $TiCl_4$, $CaCl_2$ and oxalic acid, of which the calcination enables suitable particle sizes of from 0.1 to 1 $\mu$m to be adjusted. Unfortunately, this process has the disadvantage that is requires extremely expensive starting compounds.

The object of the present invention is to provide a process for the production of alkaline-earth metal titanates and zinc titanates which can be carried out inexpensively on a large scale and which enables the average particle size to be adjusted to a favorable, desired value.

Accordingly, the present invention provides a process for the production of zinc or alkaline-earth metal titanates by precipitating zinc or alkaline-earth metal hydroxides in the presence of finely divided titanium dioxide, followed by filtration, optionally washing and calcination, wherein the hydroxides are precipitated by the simultaneous addition of a zinc or an alkaline earth metal salt solution and an alkali solution to finely divided titanium dioxide, e.g. titanium dioxide hydrolyzate sludge, at a substantially constant pH-value above about 8, preferably in the range from about pH 10 to pH 12, and the resulting suspension is calcined at a temperature above about 500° C. and preferably at a temperature of from about 700° C. to 900° C.

Hydroxides of alkaline earth metals or zinc are normally obtained in the form of finely divided, slimy deposits which are virtually impossible to filter, so that hitherto homogeneous admixture of the component containing titanium dioxide, followed by filtration, had never been considered for a commercial manufacturing process because of the prolonged washing and filtration times. In contrast, however, surprisingly it is possible by the process according to the present invention to obtain readily filterable and washable precipitates when alkaline earth metal hydroxides are precipitated onto finely divided $TiO_2$, e.g. $TiO_2$-hydrolyzate sludge. The precipitation of the hydroxides has to be carried out at a substantially constant pH-value above 8, which preferably should not vary by more than ±1 pH unit, by the simultaneous addition of an alkaline earth metal salt solution and an alkali hydroxide solution. The finely divided $TiO_2$ used for the purposes of the present invention may be, for example, a so-called flame hydrolyzate of the type formed by the oxidation of $TiCl_4$ in the vapor phase in accordance with DAS No. 1,244,125 or DAS No. 1,210,421. Suitable $TiO_2$ hydrolyzate sludges are obtained in the known hydrolysis of solutions containing titanyl sulphate by the so-called sulphate process.

One particular embodiment of the process according to the present invention starts from the $TiO_2$-hydrolyzate sludge obtained in the production of $TiO_2$ which, after washing, is adjusted to the pH-value required for precipitation and introduced into the precipitation vessel. An alkaline earth metal chloride solution and an alkali hydroxide solution, for example, are then introduced simultaneously with stirring at such a rate that the pH-value remains constant during the precipitation process.

The process according to the invention leads to readily filterable and washable deposits of hydroxide which can be filtered and washed in known filtration units. It is only by precipitating the hydroxides at a constant pH-value that it is possible to obtain commercially processible, reactive hydroxides from zinc and alkaline earth metal hydroxides and $TiO_2$-hydrolyzate sludges which can be calcined at considerably lower temperatures, preferably below 900° C., to form the corresponding alkaline earth metal titanates of suitable particle size and which do not react solely at considerably higher temperatures like the mixture of the oxides or carbonates.

Comparison precipitations have shown that the alkaline pH-value prevailing during precipitation is not sufficient in itself. If an alkali hydroxide solution is initially introduced and an alkaline earth metal salt solution, for example, subsequently added, the deposits obtained are as difficult to filter as those obtained where the opposite procedure is adopted, i.e. when the alkaline earth metal solution is initially added to the $TiO_2$-hydrolyzate and the alkaline earth metal hydroxides subsequently precipitated by the addition of sodium hydroxide.

In one particularly preferred embodiment of the process according to the invention, the alkaline earth metal hydroxides are precipitated in the presence of $TiO_2$-hydrolyzate sludges, preferably at a pH-value which corresponds to the solubility minimum. Thus, $Mg(OH)_2$ is preferably precipitated at a pH-value of about 10. The particular pH-value to be adjusted is dependent upon the required titanate. Thus, the precipitation of $Ca(OH)_2$ is preferably carried out at a pH-value of about 13 while the precipitation of $Zn(OH)_2$ is preferably carried out at a pH-value of about 8.5.

Particularly suitable alkaline earth metal salts and zinc salts are highly concentrated solutions of the type frequently obtained as secondary products in commercial processes, for example the corresponding alkaline earth metal chloride solutions, but also magnesium sulphates, calcium nitrates, zinc sulphates and other salts. The process is not adversely affected by the anions providing no substantially insoluble salts are precipitated. Suitable alkalis are the various alkali metal hydroxides such as NaOH and KOH. The precipitation rate has no real bearing upon the process according to the invention, provided that provision is made, by turbulent or intensive stirring, to ensure that no local fluctuations in the pH-value of greater than about 2 occur. Thus, equivalent $MgTiO_3$-pigments were obtained from a 20 kg batch for the production of magnesium titanate irrespective of whether precipitation was carried out over a period of 5 minutes, over a period of 1 hour or over a period of 2 hours.

The process according to the invention may be carried out in the usual apparatus of the type commonly used for the production of $TiO_2$. Thus, the usual filter units, for example rotary filters or filter plates, may be used for separating the solids from the $TiO_2$-hydrolyzates and alkaline earth metal hydroxides by filtration. Washing of the mixture which is obtained during the precipitation of alkaline earth metal hydroxide or zinc hydroxide in the presence of finely divided $TiO_2$ or $TiO_2$-hydrolyzate may be carried out on the filter itself or by resuspension and subsequent filtration. However, there is no need for the mixture to be washed before calcination. In this case, however, the water-soluble salts must be removed by washing after calcination. However, washing is preferably carried out at pH-value of about 9 to 11.

In the case of the deposits obtained by the process according to the invention, the hydroxides become washable much more quickly and more completely than in cases where the lyes or salt solutions are initially produced during precipitation.

The present invention is also applicable to the precipitation of mixed hydroxides. Thus, it may be advisable to control certain properties of the alkaline earth metal titanates or zinc titanates by the incorporation of foreign metal ions, e.g. about 0.1 to 10% by weight of $TiO_2$ of aluminum hydroxide or the oxide of phosphorus, boron and/or silicon.

In one particular embodiment, an aluminum-doped magnesium titanate may be produced by adding an aluminum chloride solution to a magnesium chloride solution and precipitating the hydroxides together after calcination. In this case, too, the filterability and washability of the precipitated metal hydroxides is considerably accelerated. In this way, it is possible to incorporate as doping ions any metals which form substantially insoluble deposits with the alkaline earth metal hydroxides in the alkaline pH-range or which are absorbed on alkaline earth metal hydroxides or titanium hydrolyzates.

The quantitative ratio of titanium to zinc or alkaline earth metal is dependent upon the required solids phase. Thus, in the production of Ca or Ba titanates, the ratio of titanium to calcium or to barium will be close to 1 if the phases crystallizing in the Perowskit lattice are to be produced in this case. By contrast, a variety of different molar ratios is possible in the precipitation of $Mg(OH)_2$ and calcination to form magnesium titanates because both $MgTiO_3$ and also $Mg_2TiO_4$ and $MgTi_2O_5$ exist as defined compounds and are of interest for various fields of application. Thus, with a molar ratio of $Mg(OH)_2$ to $TiO_2$ of 2:1, $Mg_2TiO_4$ is preferentially obtained during the subsequent calcination step, whereas with a ratio of 1:1 $MgTiO_3$ represents the most preferential phase and, where $TiO_2$ is present in excess, $MgTi_2O_5$ is formed. The average particle size of the alkaline earth metal titanates of about 0.25 to 0.5 $\mu$m is adjusted in particular through the calcination temperature or time. To obtain a narrow particle size distribution, it is essential to carry out calcination at a low temperature which should be below about 1000° C. and preferably in the range from about 700° C. to 900° C.

The invention is illustrated by the following examples:

EXAMPLE 1

In a stirrer-equipped vessel, 15.8 kg of $TiO_2$—hydrolyzate sludge containing 31% by weight of $TiO_2$ were initially introduced and adjusted, with 1.46 kg of 40% NaOH, to a pH-value of 10. Over a period of 1 hour, 19.8 kg of an $MgCl_2$-solution containing 12.2% of MgO and 11.3 kg of a 39.5% sodium hydroxide solution were simultaneously introduced by two metering pumps at a constant pH-value of 10. On completion of precipitation, the suspension was stirred for 5 minutes and subsequently filtered. The filtration rate was determined by way of three filter candles which were covered by Dralon acrylic cloths and operated under a reduced pressure of 600 mm of mercury at room temperature (25°±2° C.). The precipitated hydroxide sludges containing 14.7% of solids and 14.8% of water-soluble salts were initially introduced and the filter candles with a filter surface of 250 cm² were immersed therein and charged over a period of 3 minutes. The charging time was selected so that a filter cake layer approximately 20 mm thick was formed. After charging, the initial filter liquid was replaced by washing water, the washed water was sucked through the filter cake for a certain time and the proportion of water-soluble salts thus reduced. In order to establish comparable conditions, the washing time in the examples selected was 9 minutes. This was followed by suction drying for 2 minutes.

The thickness of the filter cake amounted to 21 mm and the moist filter cake was weighed out at 2.8 kg for a solids content of 34%. By calcination, this gave a filter capacity of 214 kg/h/m². After calcination for 1 hour at 900° C. in a muffle furnace, the content of water-soluble salts was measured at 1.4% in accordance with DIN 53 197 B. The $MgTiO_3$ white pigment formed was characterized by a lightening power of 240 in accordance with DIN 53 192. The pigments were highly pure and could be used for a variety of applications.

EXAMPLE 2

The procedure was as described in Example 1, 1% of $Al_2O_3$ in the form of aluminum sulphate being added at the end of precipitation. The solids content after precipitation amounted to 14.5% for a salt content of 13.5%. After a suction time of 3 minutes and a washing time of 9 minutes, a 2.7 kg filter cake with a thickness of 20 mm was obtained.

For a solids content of 32.3%, the calculated filter capacity amounted to 192 kg per h per m². After calcination, the content of water-soluble salts was determined at 2.4% by weight, the lightening power amounting to 200.

EXAMPLE 3

The magnesium hydroxide was precipitated as described in Example 1 by the simultaneous addition of a 33% magnesium chloride solution and 40% sodium hydroxide at pH 10 to the $TiO_2$-hydrolyzate which was used in a 5% excess. After precipitation, the hydroxide suspension contained 15.4% by weight of solids and 13.9% of salts in dissolved form. After a suction time of 3 minutes and a washing time of 9 minutes, followed by suction drying for 2 minutes, a filter cake weighing 2.6 g and having a wall thickness of 20 mm was obtained. For a solids content of 37.1%, the calculated filter capacity amounted to 212 kg/h/m². After calcination for 1 hour at 900° C., the pigment contained 1.5% by weight of water-soluble salts. Its lightening power amounted to 195.

EXAMPLE 4

15.4 kg of $TiO_2$-hydrolyzate sludge containing 31% of $TiO_2$ were initially introduced and, as in Example 1, 577 g of NaOH were added to adjust the pH-value to 11.0. The $Mg(OH)_2$ was precipitated at this pH-value by the simultaneous addition of 19.8 kg of $MgCl_2$-solution containing 12.2% of MgO and 11.3 kg of a 39.5% sodium hydroxide solution. For a solids content in the sludge of 15.3% and a salt content of 15.2%, filtration carried out after a suction time of 3 minutes and a washing time of 9 minutes, followed by drying for 2 minutes, produced 2.2 kg of a filter cake with a thickness of 18 mm, giving a filter capacity of 183 kg/h/m² for a dry residue of 37.6%. The content of water-soluble salts after calcination (1 hour at 900° C.) amounted to 1.3% by weight and the lightening power to 195.

EXAMPLE 5

The procedure was as described in Example 1 except that the Mg hydroxide was precipitated over a period of 4 hours at a pH-value of 10. The filter capacity was calculated at 229 kg/h/m². The pigment corresponded in its properties to the product of Example 1.

EXAMPLE 6

For comparison, the procedure adopted differed from the production process according to the invention, namely precipitation at a constant pH-value, and 15.7 kg of $TiO_2$ hydrolyzate sludge containing 30.7% of $TiO_2$ were initially introduced. The entire magnesium chloride liquor was added and the pH-value was subsequently adjusted to pH 10 by the addition of 40% sodium hydroxide solution over a period of 1 hour. Further processing was carried out in the same was as described in Example 1. This variant of the process gave a poorly filterable and washable precipitation product which could not filtered under commercial conditions. The solids content amounted to 14.9% and the content of water-soluble salts to 16.0%. After a suction time of 3 minutes and a washing time of 9 minutes, a moist filter cake with a wall thickness of only 6 mm weighing 765 g was obtained. For a solids content of the moist filter cake of 39.9%, the filter capacity was calculated at only 65 kg/h/m². After calcination (1 hour at 900° C.), the proportion of water-soluble salts still amounted to 4.5% and the lightening power was determined at 200.

EXAMPLE 7

This example is also intended for comparison. The entire sodium hydroxide solution was added to the $TiO_2$ hydrolyzate sludge and the pH-value was subsequently adjusted to pH 10.0 by the addition of Mg chloride solution. The quantities corresponded exactly to Example 1. After the hydroxide had been precipitated, the solids content and salt content amounted to 30.9%. Charging of the filter candles for 3 minutes and washing for a period three times longer produced a filter cake with a thickness of 5 mm and weighing 580 g. For a solids content of 39.6%, the filter capacity was calculated at 52 kg per hour per m². After 1 hour, calcination at 900° C. to form $MgTiO_3$ produced a white pigment which contained 15.7% of water-soluble salts and which was therefore unsuitable for further use. The lightening power of the Mg titanate pigment was determined at 60.

EXAMPLE 8

Precipitation in accordance with Example 1 using $MgCl_2$ and $ZnCl_2$ solution at a pH-value of 10 produced a deposit of 0.5 mole of Zn hydroxide and 1.5 mole of Mg hydroxide, per mole of $TiO_2$ in the hydrolyzate sludge initially introduced, on $TiO_2$. After precipitation, the solids content amounted to 10.7%, based on the oxides, and to 28.2% with the dissolved salts. The product was filtered by suction for 3 minutes, washed for 9 minutes and dried under suction for 1 minute. In this process, the filter capacity amounted to 192 kg/h/m². After calcination for 1 hour at 900° C., an $(Mg_{0.75}Zn_{0.25})_2TiO_3$ mixed pigment of spinel structure was obtained. It contained 0.8% of water-soluble salts and, after dry grinding, could be directly used for pigmenting paper and lacquer.

EXAMPLE 9

For comparison, the solutions corresponding to Example 8 were successively added to $TiO_2$ hydrolyzate sludge. After the addition of sodium hydroxide to the $TiO_2$ hydrolyzate, Mg- and Zn-chloride liquor were mixed and added dropwise. For the same suction, washing and drying time as in Example 8, the filter capacity only amounted to 36 kg/h/m². The white pigment obtained after calcination for 1 hour at 900° C. contained 4.3% of water-soluble salts, showed high solubility in acids and was therefore unsuitable for use as a white pigment.

EXAMPLE 10

For comparison, the same quantities as in Examples 8 and 9 were reacted with the difference that the Mg-Zn-chloride liquor was initially added to the $TiO_2$ hydrolyzate sludge, followed by introduction of the sodium hydroxide solution. Precipitation produced a non-filterable sludge which, for a solids content of 30% with salt and 10.5% without salt, gave a filter capacity of only 61 kg/h/m² after suction for 3 minutes, washing for 9 minutes and drying for 3 minutes. After calcination, the Zn, Mg-spinel contained 25.8% of water-soluble salts and was therefore unsuitable for the pigmenting of paper or lacquers.

It will be appreciated that the instant specification and examples are set forth by way of illustration and not limitation, and that various modifications and changes may be made without departing from the spirit and scope of the present invention.

What is claimed is:

1. A process for the production of a titanate of at least one member selected from the group consisting of zinc and an alkaline earth metal comprising simultaneously adding a solution of a salt of said member and an alkali solution to a suspension of $TiO_2$ at a substantially constant pH above about 8, thereby to form a precipitate comprising $TiO_2$ and the hydroxide of said member, filtering said suspension to recover the solids, and calcining the solids at a temperature above about 500° C. thereby to produce the titanate.

2. A process as claimed in claim 1, wherein the $TiO_2$ suspension is at a pH of about 10 to 12.

3. A process as claimed in claim 1, wherein calcination is effected at about 700° to 900° C.

4. A process as claimed in claim 3, wherein said member comprises magnesium and the $TiO_2$ suspension is at a pH of about 10.

5. A process as claimed in claim 4, wherein the molar ratio of titanium to magnesium is from about 1:0.3 to 1:3, calcination producing at least one of $MgTi_2O_5$, $MgTiO_3$ and $Mg_2TiO_4$ in dependence upon the molar ratio.

6. A process as claimed in claim 1, wherein a soluble salt of at least one aluminum, phosphorus, boron or silicon is also added simultaneously to precipitate the hydroxide of aluminum or the oxide of phosphorus, boron or silicon in about 0.1 to 10% by weight of $TiO_2$, the calcined titanate thereby being doped with aluminum, phosphorus, boron or silicon.

7. A process as claimed in claim 6, wherein said soluble salt comprises aluminum.

8. A process as claimed in claim 3, wherein said member comprises calcium and the $TiO_2$ suspension is at a pH of about 13.

9. A process as claimed in claim 3, wherein said member comprises zinc and the $TiO_2$ suspension is at a pH of about 8.5.

10. A process as claimed in claim 3, wherein said member comprises a mixture of zinc and magnesium and the $TiO_2$ suspension is at a pH of about 10 to 12.

11. A process as claimed in claim 3, wherein the $TiO_2$ suspension is a $TiO_2$ hydrolyzate sludge, the pH is about 10 to 12 and the alkali is sodium hydroxide.

* * * * *

UNITED STATES PATENT AND TRADEMARK OFFICE
CERTIFICATE OF CORRECTION

PATENT NO. : 4,173,485
DATED : November 6, 1979
INVENTOR(S) : Peter Woditsch et al It is certified that error appears in the above-identified patent and that said Letters Patent are hereby corrected as shown below:

Column 1, line 41    delete "is" and insert --it--.

Column 4, line 42    delete "calcination" and insert --calculation--

Column 7, line 16    insert --of-- before "aluminum--.

Signed and Sealed this

*Twenty-fifth* Day of *March 1980*

[SEAL]

*Attest:*

SIDNEY A. DIAMOND

*Attesting Officer*   *Commissioner of Patents and Trademarks*